(12) United States Patent
Toh et al.

(10) Patent No.: US 7,188,255 B1
(45) Date of Patent: Mar. 6, 2007

(54) SOFTWARE DELIVERY SYSTEM

(75) Inventors: Ker Sze Toh, Singapore (SG); Lay Sie Lim, Singapore (SG); Chee Seng Poon, Singapore (SG); Dwight Allan DeBacker, Singapore (SG); John W. Lance, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/483,063

(22) Filed: Jan. 14, 2000

(30) Foreign Application Priority Data

Sep. 23, 1999 (SG) ................................ 9904743-3

(51) Int. Cl.
*G06F 12/14* (2006.01)
(52) U.S. Cl. .......................... 713/191; 713/2; 713/193; 717/169; 717/175; 705/58
(58) Field of Classification Search ............ 703/51–59; 713/2, 200–201, 189, 191, 193; 717/169, 717/172, 175, 177; 705/51–59
See application file for complete search history.

(56) References Cited

U.S. PATENT DOCUMENTS

| 5,010,571 | A | * | 4/1991 | Katznelson ................... 705/53 |
| 5,058,162 | A | * | 10/1991 | Santon et al. .................. 705/51 |
| 5,771,287 | A | * | 6/1998 | Gilley et al. ................. 713/191 |
| 5,894,571 | A | * | 4/1999 | O'Connor ....................... 713/2 |
| 5,933,087 | A | * | 8/1999 | Wright et al. ............... 340/5.21 |
| 5,933,497 | A | * | 8/1999 | Beetcher et al. .............. 705/59 |
| 5,953,533 | A | * | 9/1999 | Fink et al. ................... 717/175 |
| 5,978,590 | A | * | 11/1999 | Imai et al. ................... 717/177 |
| 6,016,400 | A | * | 1/2000 | Day et al. .................... 717/175 |
| 6,067,640 | A | * | 5/2000 | Akiyama et al. .............. 714/38 |
| 6,075,862 | A | * | 6/2000 | Yoshida et al. ............... 380/28 |
| 6,134,324 | A | * | 10/2000 | Bohannon et al. ............ 705/52 |
| 6,269,377 | B1 | * | 7/2001 | Collie et al. ............ 707/103 R |
| 6,298,443 | B1 | * | 10/2001 | Colligan et al. ............ 713/200 |
| 6,411,941 | B1 | * | 6/2002 | Mullor et al. ................. 705/59 |
| 6,857,078 | B2 | * | 2/2005 | Colvin ....................... 713/202 |

FOREIGN PATENT DOCUMENTS

JP          10-011282      *  1/1998
JP          10-11282 A     *  1/1998

* cited by examiner

*Primary Examiner*—Gilberto Barron, Jr.
*Assistant Examiner*—Minh Dinh

(57) ABSTRACT

The present software delivery system includes a computer system and a CD-ROM. The computer system includes a central processing unit communicably coupled to a CD-ROM drive, a hard drive, and a non-volatile memory. The CD-ROM contains a control module and a plurality of software modules. Each of the software modules contains one or more software products which are the software to be delivered to the user of the computer system. Each of the software modules is assigned a unique identifier (ID) such as an identification number or code. In the non-volatile memory, addresses have been designated to contain an encrypted code key which comprises a list of identification numbers corresponding to the identification numbers of the software modules.

19 Claims, 5 Drawing Sheets

SOFTWARE DELIVERY SYSTEM

FIELD OF THE INVENTION

The present invention relates generally to the field of computer systems, and in particular to a software delivery system which can conveniently and efficiently deliver custom-ordered software to a customer.

BACKGROUND OF THE INVENTION

Delivering software to customers has become a complicated business, particularly for the computer manufacturers. In the past, customers simply bought a computer system from the manufacturer and bought the software from third-party vendors. The responsibility of making certain the compatibility of the software to the purchased system and maintaining a back-up copy (in case of a hard disk crash or inadvertent erasure of the software) was on the end user. The end user also exercised his discretion in making unauthorized duplicate copies, and the third-party software vendors were ultimately responsible for preventing such practices.

In the modern computer era, software vendors and computer manufacturers work very closely together to bundle a set of software with the computer system being sold to the customers. As a result, much of the responsibility which was left for the end user is now borne by the manufacturer.

From the customer's side, the manufacturers are now responsible for ensuring that the software it delivers to the end user is compatible with the particular computer system which was purchased by the customer. In the modern era where computer systems come in an array of hardware configurations, ensuring that a particular software will successfully run on a particular model requires much effort. It is not uncommon for a manufacturer to spend many man-hours testing the software for different models to ensure compatibility, a task which can be quite costly.

In addition to ensuring the compatibility of the software, the manufacturers must provide effective customer support. This includes value-added services such as configured-to-order options so that the customers can choose the software he or she wants with the computer system. Also, the manufacturer should provide some mechanism for software recovery in case of a hard disk crash or an inadvertent erasure of the software. Moreover, it would be beneficial for the manufacturers to provide options for additional orders of software. A successful implementation of these services depend on a fast and reliable way to deliver the requested software from the manufacturer to the hard disk of the customer's purchased system.

From the software vendor's side, the manufacturers are often encouraged to deliver the software to the customers in a way which prevents or discourages unauthorized duplicate copies. Successful implementation of such a system is a great benefit to the manufacturer (in addition to the software vendors, of course) as it can often negotiate for a better price for the software from the vendors, the savings of which the manufacturer can pass down to the customers.

The various software delivery systems currently implemented by the industry fail to address some or all of the issues described above. For example, in the most common system where an unspecified bundle of software is simply included in the hard disk of a purchased computer system, the customer has no choice in what software he desires, and all back-up copies must be made by the customer if such copying is allowed. Although this type of a system can allow the manufacturer to ensure the compatibility of the installed software to the hardware, the customer has to accept the software he may not wish to receive, and has no choice to request the software he truly needs. Moreover, the customer must expend the time and effort to make the backup files. Furthermore, if the customer is allowed to make duplicate copies for backup purposes, there is virtually no assurance that the additional duplicate copies are not being made for other unauthorized purposes such as unauthorized selling or sharing of the software.

To address the inadequacies of such systems, some computer manufacturers have implemented a configured-to-order (CTO) system such as the one described in the U.S. Pat. No. 5,894,571. In this system, the manufacturer first receives a customer order for a computer system. The customer order includes a list of hardware configuration components and a list of software configuration components. The hardware components which are designated by the list are first assembled. The software components which are designated by the list are then configured and written onto a CD-ROM. The CD-ROM is then used to install the selected software configuration onto the custom hardware configuration and subsequently serve as a permanent backup copy for the customer. The CD-ROM is written with an identifier of the specific computer hardware assembled in the manufacturing process and the identification written to the CD-ROM is checked when the software is loaded from the CD-ROM onto the computer so that the software is only accessible to the specified computer hardware.

This system addresses some of the concerns mentioned above, but not all. For one, it does give the customer the option to choose the software he or she wants. The system also provides a backup copy for the specific software purchased by the customer while preventing or limiting software piracy. However, the system suffers from, among others, two main shortcomings.

First, from the customer's side, it does not allow quick and convenient delivery of additional after-sale orders for software from the customer. In other words, if the customer were to want to purchase additional software products from the manufacturer which are available for the purchased hardware configuration, the manufacturer must send an additional CD-ROM (or other types of storage device containing the software), or the customer must download the software from a network such as the internet. Both of these delivery methods are traditional methods which have the obvious shortcomings such as additional expense (for the case of CD-ROM), or long download time (for the internet case).

Second, from the manufacturing side, in the system described above, the manufacturer can produce the CD-ROM containing the custom-ordered software only after the customer orders a computer system and specifies the hardware configuration components and software configuration components. The CD-ROM cannot be mass produced before the order is placed. From the manufacturing point of view, the ability to mass produce a CD-ROM prior to receiving the order from the customer has a number advantages such as fast turnaround time for the ordering customers, and savings in cost and labor for the manufacturer.

Therefore, it is obvious that there is a great desirability for a software delivery system which can provide customers with choices of software when purchasing a computer system and which can quickly and reliably deliver the software both before and after the delivery of the computer system, while facilitating savings in manufacturing cost and preventing software piracy.

SUMMARY OF THE INVENTION

The present invention facilitates a quick and reliable delivery of software to a customer. The present software delivery system may be used to recover pre-ordered software as well as to obtain copies of new software. The present software delivery system generally includes a conventional computer system and a CD-ROM. The computer system includes conventional components associated with conventional computer systems, but in particular, includes a central processing unit communicably coupled to a CD-ROM drive, a hard drive, and a non-volatile memory. The non-volatile memory includes an encrypted codekey containing a list of identification numbers, and the serial number of the computer system.

The CD-ROM contains a control module and a plurality of software modules. Each of the software modules contains one or more software products which are the software to be delivered to the user of the computer system. Each of the software modules is assigned a unique identifier (ID) such as an identification number or code.

In the non-volatile memory, addresses have been designated to contain an encrypted code key which comprises a list of identification numbers corresponding to the identification numbers of the software modules. Enough addresses are designated to store the identification numbers of all of the software modules.

Before a customer orders a computer system and the software products, the manufacturer tests all of the software products which are available for a particular hardware configuration of a computer system to make certain that the software is compatible with the computer system. Once the software products are fully tested, they are written onto a CD-ROM. The tested software products are written onto the CD-ROM in software modules and each module is assigned a unique identification number. Each of the software modules may contain one or more software products including any installation programs. A control module is then written onto each of the CD-ROMs containing the software modules.

When the manufacturer receives an order from a customer specifying a particular computer system and a set of software product, the manufacturer installs into the hard drive of the ordered computer system the requested software products. The manufacturer then selects the particular pre-made CD-ROM which contains the software products requested by the customer and which has been prepared for the particular hardware configuration ordered by the customer. The manufacturer then determines the software modules which contain the ordered software products and obtains the unique identification numbers which were assigned to the modules. The manufacturer then encodes the identification numbers and writes the encoded identification numbers into the code key of the non-volatile memory of the computer system. The manufacturer ships the computer system along with the CD-ROM to the customer. The CD-ROM serves as both a permanent backup and a source for additional software products for the customer.

The process for recovering already-ordered software begins by inserting the CD-ROM into the CD-ROM drive. The control module seeks the address of the encrypted codekey in the non-volatile memory of the user's computer system. Once located, the codekey is decoded, and the resulting list of identification numbers which correspond to the ordered software modules is read. The control module then matches the identification numbers from the non-volatile memory against the identification numbers of the software modules. A match would indicate to the control module that the particular software module bearing the identification number was ordered by the customer. Once all of the identification numbers from the memory have been considered, the control module installs the software products in each of the designated modules via the appropriate installers per the user's specification.

To obtain additional software, the customer specifies the additional software, and a software upgrade module which is specific to the customer's request is downloaded from a website. When executed in the customer's computer system, the upgrade module adds the identification numbers of the additional software into the non-volatile memory of the computer system. The software recovery process is then used to install the new software.

DETAILED DESCRIPTION OF THE INVENTION

Figure 1:
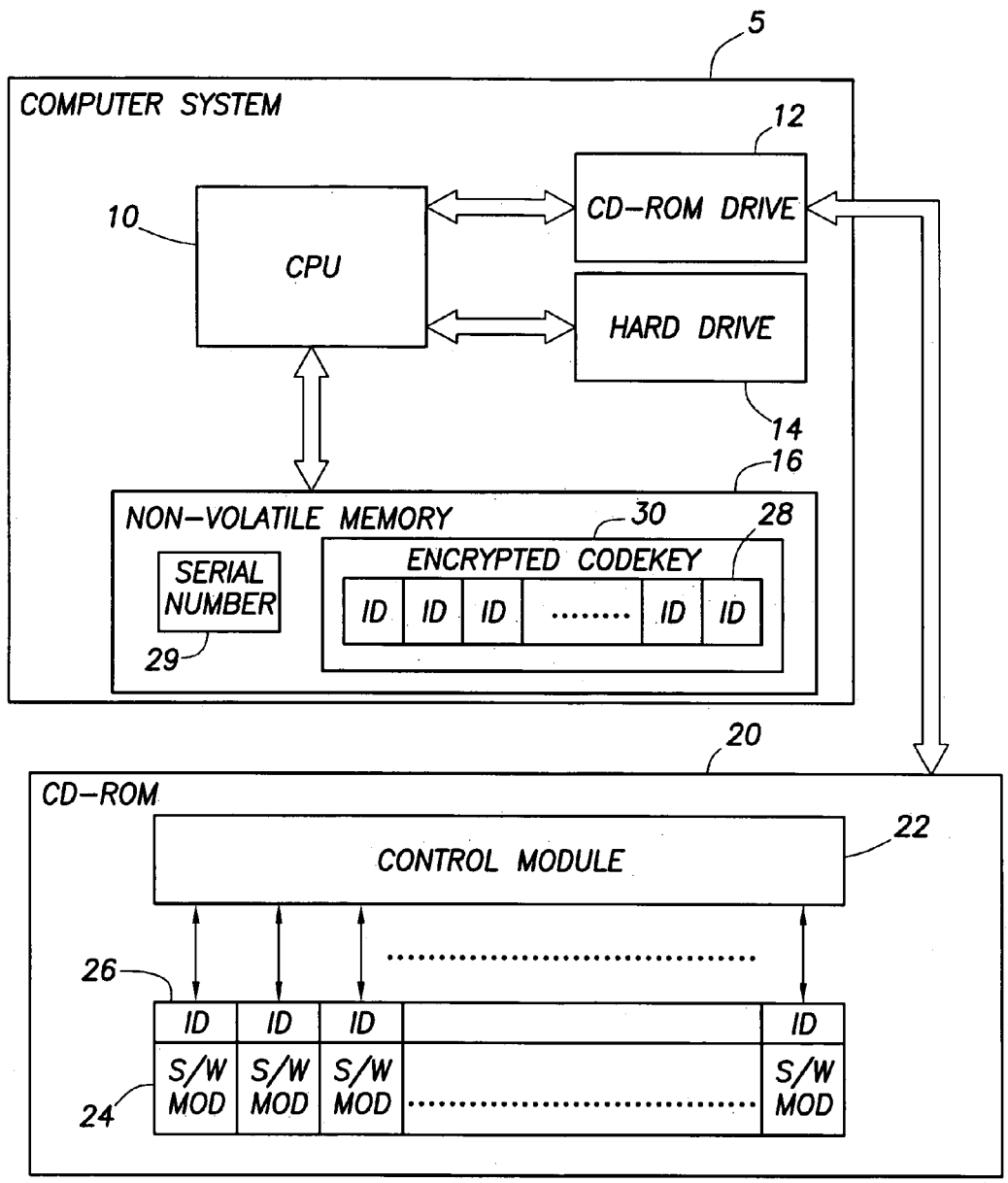
FIG. 1 is a schematic block diagram illustrating the present software delivery system.

FIG. 1 illustrates the preferred embodiment of the present software delivery system. Referring to FIG. 1, the present software delivery system generally includes a conventional computer system 5 and a CD-ROM 20. The computer system 5 includes conventional components associated with conventional computer systems, but in particular, includes a central processing unit (CPU) 10 communicably coupled to a CD-ROM drive 12, a hard drive 14, and a non-volatile memory 16, e.g., read-only-memory (ROM). The non-volatile memory includes an encrypted codekey 30 containing a list of identification numbers 28 and the serial number 29 of the computer system.

The CD-ROM 20 contains a control module 22 and a plurality of software modules 24. Each of the software modules 24 contains one or more software products which are the software to be delivered to the user of the computer system 5. Each of the software modules 24 is assigned a unique identifier (ID) 26 such as an identification number or code.

In the non-volatile memory 16 of the computer system 5, addresses have been designated to contain an encrypted code key 30 which comprises a list of identification numbers 28 corresponding to the identification numbers 26 of the software modules. Enough addresses are designated to store the identification numbers of all of the software modules 24. It should be appreciated by those skilled in the art that although a CD-ROM was used as a storage device in the preferred embodiment, other types of storage devices such as DVD for floppy disk may be utilized as well.

To illustrate the workings of the present invention, the operation of the present software delivery system shall be described in the context of a customer purchasing a computer system from a computer manufacturer utilizing the present software delivery system. It should be understood, however, that the present system may be utilized in a multitude of ways, and is not limited to the particular example shown in this description. For instance, the present system may also be used by software vendors to deliver software to a customer with existing computer system.

In a typical computer manufacturing environment, a customer places an order for a computer system from the manufacturer. The order may be of a computer system having custom hardware configuration as in a built- to-order (BTO) system, or it may be an off-the-shelf (OTS) computer system. In this example, the customer specifies a list of software products which he or she wishes to install onto the hard disk of the ordered computer system. The software products may include, for example, an operating system, a utilities program, or an applications program.

Figure 2:
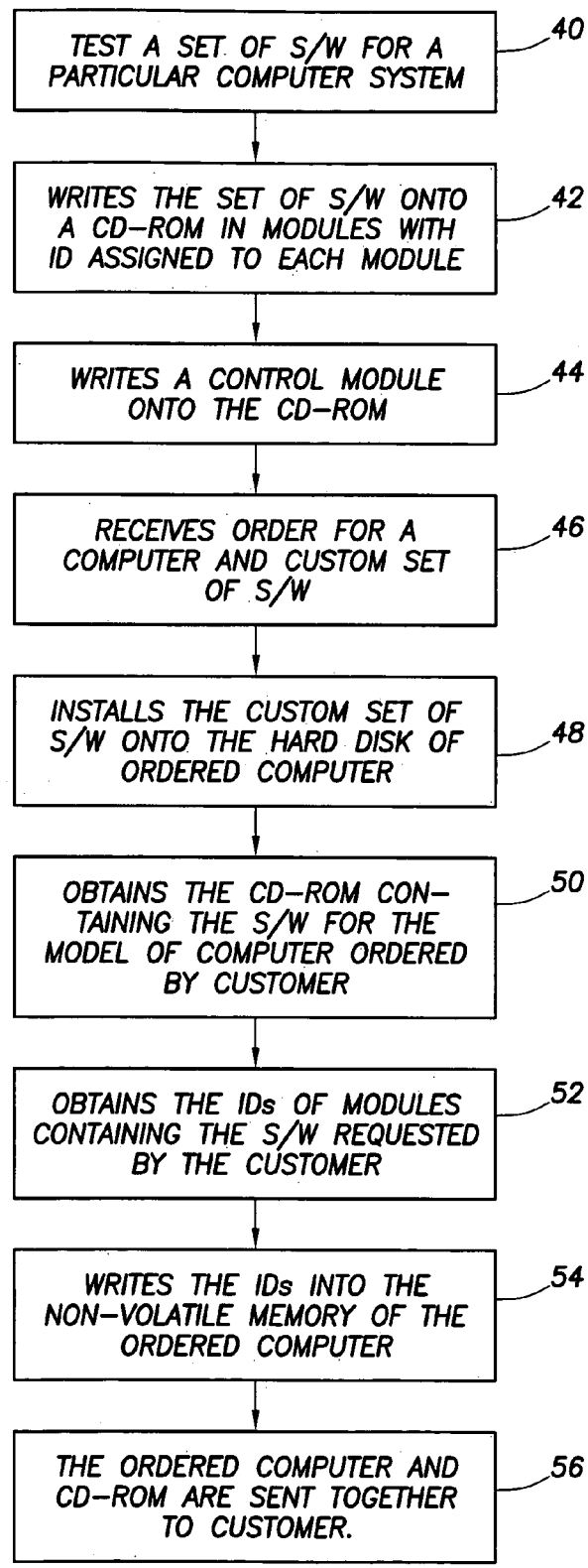
FIG. 2 is a flow diagram illustrating the steps for preparing the software delivery system.

In light of the manufacturing environment described above, the process flow for implementing the present software delivery system is shown in the flow diagram of FIG. 2. In step 40, before a customer orders a computer system and the software products, the manufacturer tests all of the software products which are available for a particular hardware configuration of a computer system to make certain that the software is compatible with the computer system. Once the software products are fully tested, they are written onto a suitable storage device, in this case, a CD-ROM disc, in step 42. Since typically there will be multiple hardware configurations, multiple CD-ROMs may be prepared containing a different set of software products to accommodate for the different computer systems.

Still referring to step 42, the tested software products are written onto the CD-ROM 20 in software modules 24 and each module is assigned a unique identification number 26 (see FIG. 1). Each of the software modules 24 may contain one or more software products including any installation programs. Although it is entirely possible to place the software products individually in the CD-ROM rather than in modules, in the preferred embodiment, the software products are placed in modules as the software modules give the manufacturer the flexibility to bundle certain software products as it sees fit. For instance, in some situations, a pair of software products may be complementary products which need to be used together. In other instances, the software products may be bundled up for n-technical reasons, such as for special promotions.

In the next step 44, a control module 22 is written onto each of the CD-ROMs containing the software modules 24. The control module 22 controls the eventual installation of the software products in the software modules 24 onto the hard disk 14 of the computer system 5. The details of the control module's function is described later below. With the control module 2422 and the software modules 24 written onto the CD-ROM, the preparation of the CD-ROM is complete. The fully loaded CD-ROMs are ready to be shipped away when the customer order is received.

In step 46, the manufacturer receives an order from a customer specifying a particular computer system and a set of software products. In a BTO system, when the order for a computer system is received, the manufacturer builds the computer system per the ordered specification. In an OTS system, the manufacturer simply obtains the particular computer system requested by the customer. The present invention is compatible with either system.

Referring now to FIG. 1 and FIG. 2, in step 48, the manufacturer installs into the hard drive 14 of the ordered computer system 5 the requested software products. In step 50, the manufacturer then selects the particular pre-made CD-ROM 20 which contains the software products requested by the customer and which has been prepared for the particular hardware configuration ordered by the customer. It should be emphasized here that the pre-made CD-ROM 20 may contain other software products besides those ordered by the customers. These additional software products will not be accessible by the customer until proper access is given by the manufacturer.

Still referring now to FIG. 1 and FIG. 2, in step 52, the manufacturer determines the software modules which contain the ordered software products and obtains the unique identification numbers 26 which were assigned to the modules. In step 54, after obtaining the identification numbers, the manufacturer then encodes the identification numbers and writes the encoded identification numbers into the code key 28 of the non-volatile memory 16 of the computer system 5 ordered by the customer. In step 56, the manufacturer ships the computer system 5 along with the CD-ROM 20 to the customer. The CD-ROM 20 serves as both a permanent backup and a source for additional software products for the customer.

In the preferred embodiment of the present invention, the manufacturer installs the ordered set of computer products onto the hard disk of the ordered computer system in step 48. However, it should be appreciated that it would be possible for the manufacturer to forgo this step 48 and simply ship the computer system and the pre-made CD-ROM to the customer. The customer can then use the CD-ROM to install the requested software onto the hard disk.

When the customer receives the ordered computer system 5 and the CD-ROM 20, the CD-ROM is simply kept until it is needed (for the preferred embodiment where the manufacturer has already installed the requested software). The CD-ROM 20 may be needed in the future for two main reasons. The first reason is to restore or recover the ordered software if the hard disk 14 were to crash, or if the ordered software were to be inadvertently erased or corrupted. In other words, it is to obtain an additional copy of the software which was ordered at the time the computer system was purchased. The second reason for needing the CD-ROM 20 is to install additional software which the customer did not order initially, but which is available in the CD-ROM.

Figure 3:
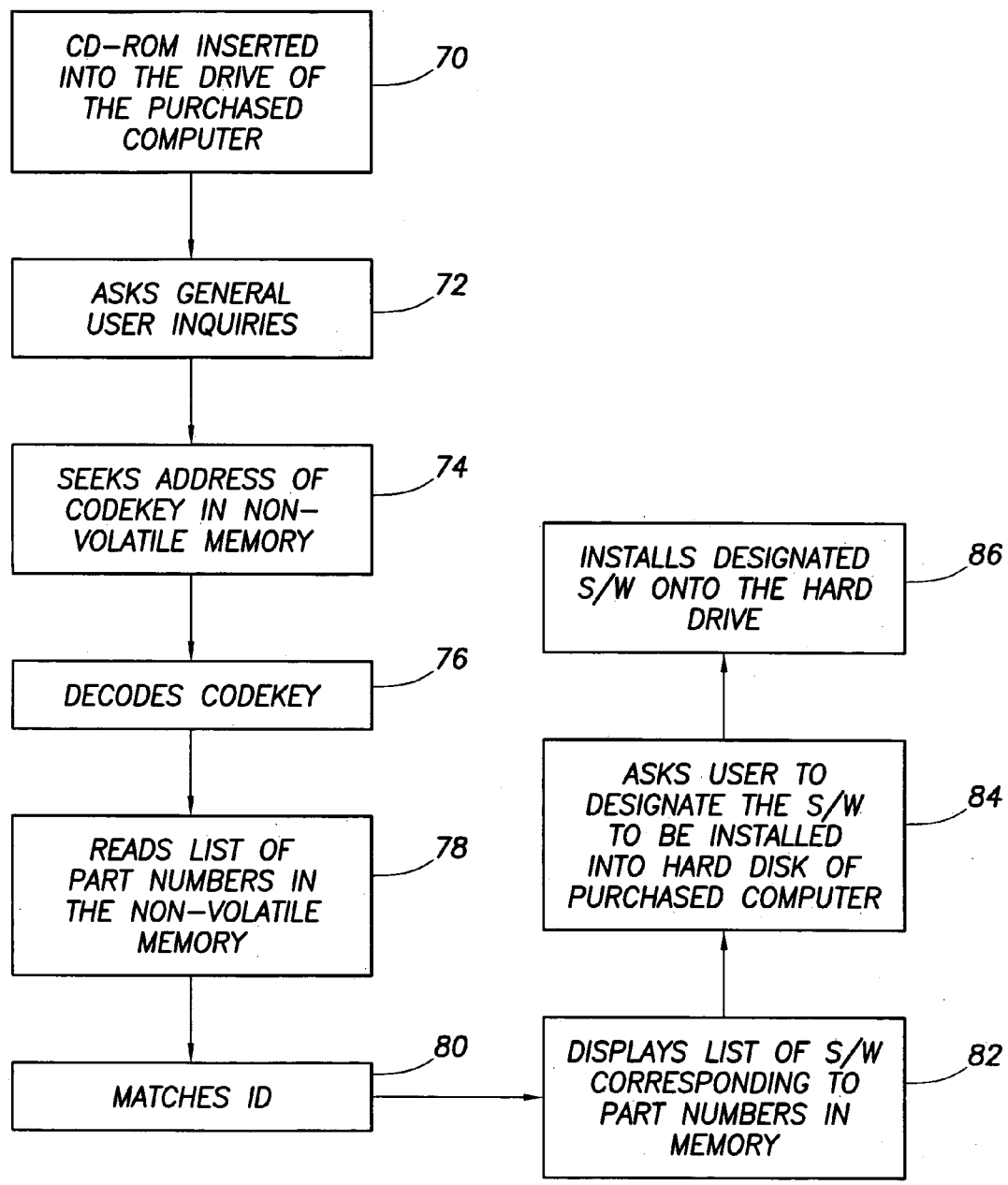
FIG. 3 is a flow diagram illustrating the steps for recovering the pre-ordered software.

Now referring to FIG. 3, the flow diagram shown therein illustrates the process by which a software product is installed from the CD-ROM to the hard disk of the customer's computer. The process for installing the already-ordered software and the new software is slightly different. The flow diagram in FIG. 3 illustrates all of the steps necessary to install already-ordered software. The process for installing the new software also utilizes the steps in shown in the flow diagram of FIG. 3, but also requires additional steps.

Now referring to FIGS. 1 and 3, the process for recovering already-ordered software begins by inserting the CD-ROM in the CD-ROM drive 12 (FIG. 1) in step 70. Once inserted, the control module 22 initiates the recovery process by first asking the user some generic inputs (step 72) such as the model or serial number of the purchased computer system etc. It is important to note here that information such as the model or serial number is not necessary for the recovery operation, though it nevertheless can be useful for some purposes. For instance, in embodiment of the present invention, if the entered model or serial number does not correspond to the hardware configuration the CD-ROM 20 was created for, then the control module immediately terminates the recovery process and indicates to the user that the inserted CD-ROM 20 cannot be used to recover the software for that hardware configuration.

Still referring to FIGS. 1 and 3, after the user has answered the inquiries, the control module 22 proceeds to the next step 74 where it seeks the address of the encrypted codekey 30 in the non-volatile memory 16 of the user's computer system 5. Once located, the codekey 30 is decoded in step 76, and the resulting list of identification numbers 28 which correspond to the ordered software modules is read in step 78. The control module 22 then matches the identification numbers 28 from the non-volatile memory 16 against the identification numbers 26 of the software modules 24 in step 80. A match would indicate to the control module 22 that the particular software module bearing the identification number was ordered by the customer. Once all of the identification numbers 28 from the memory 30 have been considered, in step 82, the control module 22 displays a list of software modules having an identification number which corresponds to the identification number extracted from the memory 16. The control module 22 then, in step 84, prompts the user to designate the software modules he or she wishes to install onto the hard drive 14 of the computer system 5. Then in step 86, the control module 22 installs the software products in each of the designated modules via the appropriate installers. The software recovery process is now completed.

Figure 4:
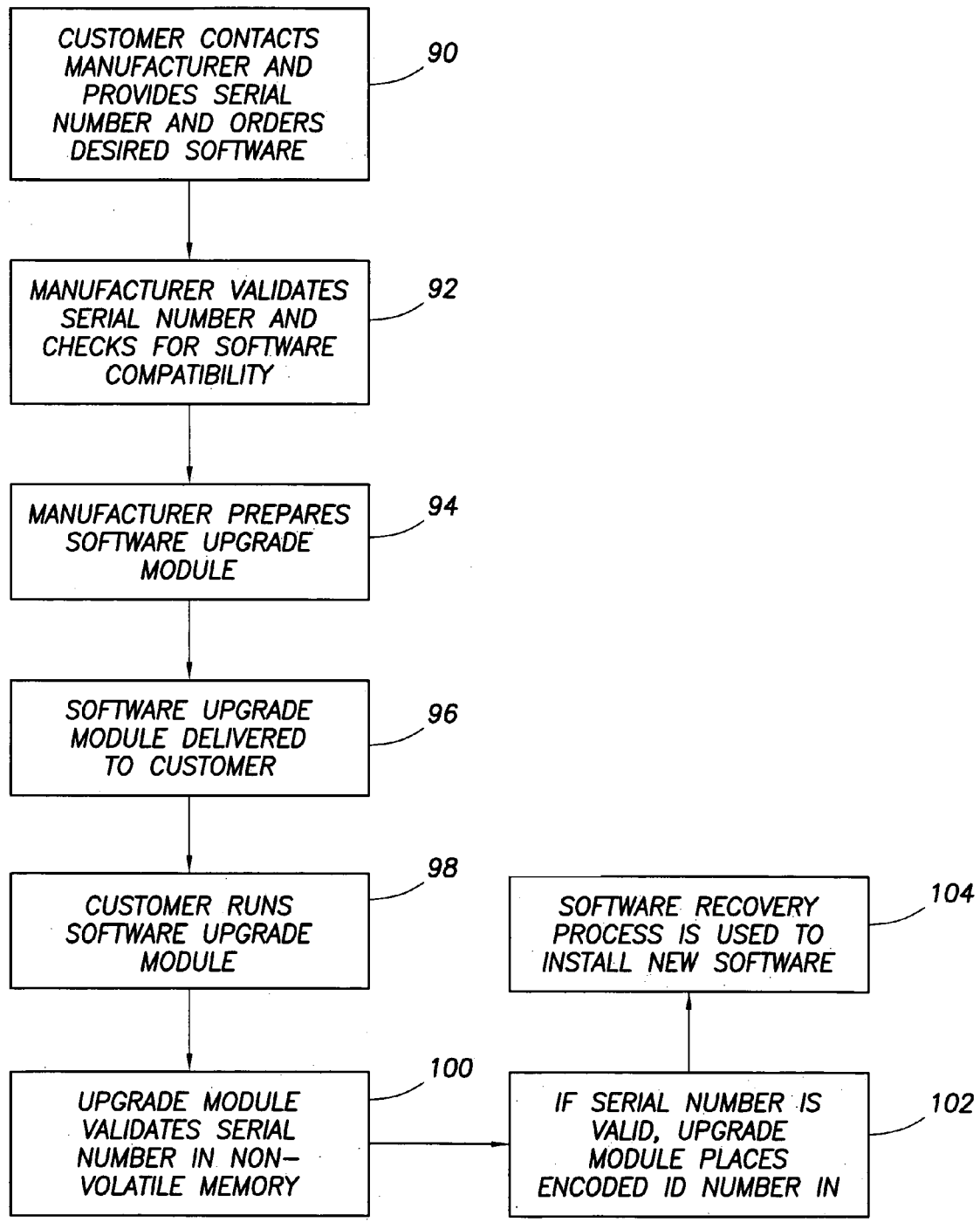
FIG. 4 is a flow diagram illustrating the steps for obtaining additional software for the preferred embodiment of the present invention.

In addition to allowing the customer to restore his ordered software, the preferred embodiment of the present software delivery system allows the customer to obtain additional software products which he did not initially order, but which are included in the CD-ROM. FIG. 4 illustrates the process for delivering the additional software.

Referring now to FIG. 4, in step 90, the customer contacts the manufacturer and orders the additional software. When the customer contacts the manufacturer, he is required to supply the serial number of the computer system he ordered. Preferably, the process in step 90 is performed via the manufacturer's website, though other traditional modes of communication may also be used.

In step 92, the manufacturer checks the serial number for its validity and also checks to see if the software ordered by the customer is compatible with the computer system bearing the serial number. If it is determined that the serial number is not valid or that the software is not compatible with the particular computer system, the manufacturer rejects the customer's request and informs him of the reason. If the serial number, however, is valid and the software is deemed compatible, in step 94, the manufacturer prepares a software upgrade module which is specific to the customer's computer and the ordered software, such that it can only be used to upgrade the computer system bearing the serial number and would allow the customer to access only the software he ordered. The software upgrade module is then sent to the customer in step 96. Preferably, the software upgrade module is simply downloaded from the manufacturer's website. However, it can also be delivered to the customer in a digital storage medium such as a diskette or CD-ROM.

Now referring to FIG. 1 and FIG. 4, once the customer obtains the software upgrade module, he executes it in his computer system 5 in step 98. In step 100, the upgrade module first seeks to the non-volatile memory 16 to locate the serial number 29 and matches the serial number 29 in the memory 16 against that supplied by the customer. If the serial number 29 of the computer system does not match with the one provided by the customer, the software upgrade process terminates and the reason for the termination is supplied to the customer. If on the other hand, the serial number 29 does match, then in step 102, the upgrade module places an encoded identification number of each of the ordered software in the encrypted codekey 30 of the non-volatile memory 16. Because now the codekey 30 contains the identification numbers of the additionally ordered software products, in step 104, the customer can simply use the original CD-ROM 20 to install the new software per the software recovery process as shown in FIG. 3.

It is to be appreciated by those skilled in the art that although the preferred embodiment was shown and described above, other embodiments are possible. In one alternative embodiment, the computer system does not contain the serial number of the computer system, and the CD-ROM only contains the software product ordered initially by the customer. In this embodiment, the CD-ROM is only used for software recovery; it is not used to delivery additional after-sale software products.

Figure 5:
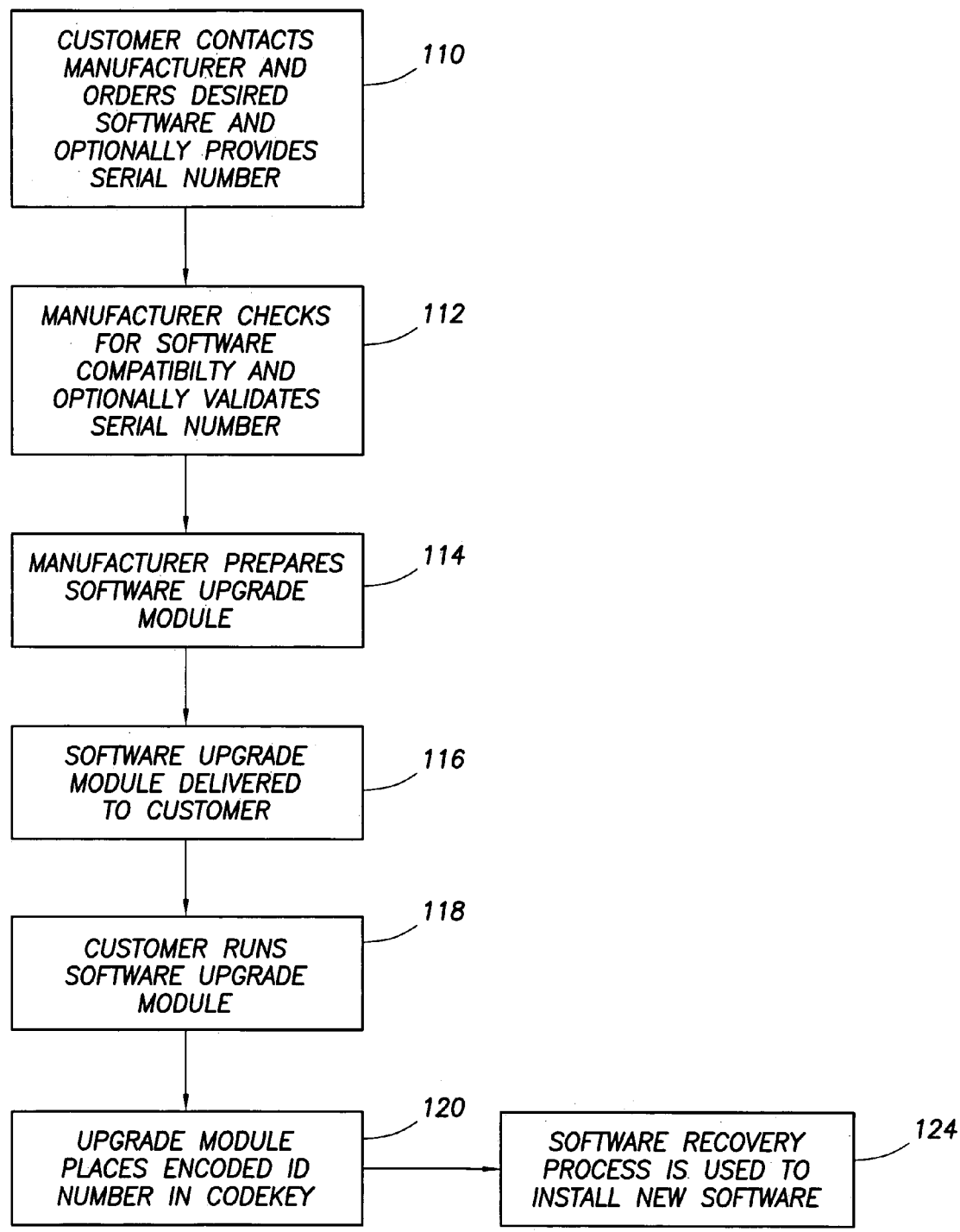
FIG. 5 is a flow diagram illustrating the steps for obtaining additional software for an alternative embodiment of the present invention.

In another alternative embodiment, the non-volatile memory of the computer system does not contain the serial number of the computer system, and hence, no validation of the serial number is conducted during the software upgrade process. The process flow for the software upgrade for this alternative embodiment is shown in FIG. 5. In step 110 of FIG. 5, the customer contacts the manufacturer and orders the additional software. When the customer contacts the manufacturer, the manufacturer may optionally require the customer to provide the serial number of the computer simply to verify that a computer system has been properly purchased. Preferably, the process in step 110 is performed via the manufacturer's website, though other traditional modes of communication may also be used.

In step 112, the manufacturer checks the serial number for its validity (if provided) and checks to see if the software ordered by the customer is compatible with the computer system bearing the serial number. If it is determined that the serial number is not valid or that the software is not compatible with the particular computer system, the manufacturer rejects the customer's request and informs him of the reason. If the serial number, however, is valid and the software is deemed compatible, in step 114, the manufacturer prepares a software upgrade module which is specific to the ordered software, such that it would allow the customer to access only the software he ordered. The software upgrade module is then sent to the customer in step 116. Preferably, the software upgrade module is simply downloaded from the manufacturer's website. However, it can also be delivered to the customer in a digital storage medium such as a diskette or CD-ROM.

Now referring to FIG. 1 and FIG. 5, once the customer obtains the software upgrade module, he executes it in his computer system 5 in step 118. In step 120, the upgrade module seeks to the non-volatile memory 16 and places an encoded identification number of each of the ordered software in the encrypted codekey 30 of the non-volatile memory 16. Because now the codekey 30 contains the identification numbers of the additionally ordered software products, in step 124, the customer can simply use the original CD-ROM 20 to install the new software per the software recovery process as shown in FIG. 3.

In addition to the alternative embodiments described above, the present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

We claim:

1. A process for facilitating a delivery of custom-ordered software products to a computer system, said computer system having a processor, a digital storage drive, a hard disk, and a non-volatile memory, said process comprising:
   receiving, by a manufacturer of the computer system, an order for the computer system from one of a customer and a vendor;
   writing a set of software products onto a digital storage device, said set of software products containing at least one custom-ordered software product and other software products;
   assigning a unique identifier for each software product in said digital storage device;
   writing, by the manufacturer of the computer system, only the identifiers of said custom-ordered software products into the non-volatile memory of said computer system;
   shipping together, by the manufacturer of the computer system, the computer system and the digital storage device to the customer or vendor;
   inserting said digital storage device into said digital storage drive;
   reading said identifiers in said non-volatile memory of said computer system;
   comparing said identifiers in said non-volatile memory with said identifiers of the software products stored on the digital storage device; and
   installing the custom-ordered software products having identifiers that match the identifiers in said non-volatile memory but not installing the other software products.

2. The method as recited in claim 1 wherein said set of software products is written onto said digital storage device before said custom-ordered software is ordered by a customer.

3. The method as recited in claim 1 further comprising testing the set of software products before it is written onto said digital storage device.

4. The method as recited in claim 1 wherein said identifier in said non-volatile memory is encrypted.

5. The method as recited in claim 1 further comprising checking a serial number of said computer system before writing the identifier of said custom-ordered software products into the non-volatile memory of said computer system.

6. A method, comprising:
   receiving, by a computer manufacturer, an order for a computer system from one of a customer and a vendor;
   preparing a digital storage media, by a computer manufacturer, the digital storage media storing software products that are compatible with the computer system, at least one of the software products being requested and at least one of the software products being unrequested by the customer or vendor;
   obtaining, by the computer manufacturer, unique identifiers for each of the requested software products;
   storing, by the computer manufacturer, the unique identifiers of the requested software products in a non-volatile memory of the computer system, but not storing unique identifiers of the unrequested software products in the non-volatile memory;
   shipping simultaneously, by the computer manufacturer, the computer system along with the digital storage media to the customer or vendor;
   if the computer system crashes or loses data, performing a software recovery of the requested software products by comparing the unique identifiers stored in the non-volatile memory with unique identifiers of the requested software stored by the digital storage media; and
   if a customer makes a predetermined purchase, installing a previously unrequested software product stored on the digital storage media by adding the previously unrequested software product's unique identifier into the non-volatile memory after said shipping.

7. The method of claim 6 further comprising comparing a serial number of the computer system with a serial number provided by a user and only adding said unrequested software product's unique identifier into the non-volatile memory if the serial numbers match.

8. A method, comprising:
   obtaining, by a computer manufacturer, unique identifiers for each of a plurality of software products;
   encoding, by the computer manufacturer, the unique identifiers into a non-volatile memory of a computer system;
   shipping simultaneously, by the computer manufacturer, the computer system along with a digital storage media to one of a customer and a vendor, the digital storage media storing a backup copy of the plurality of software products,
   wherein the software products are installable by accessing the unique identifiers in the non-volatile memory;
   storing on the digital storage media additional software products that are compatible with the computer system:
   receiving, by the computer manufacturer a request by a customer to purchase at least one of the additional software products after said shipping; and
   delivering, by the computer manufacturer, a software upgrade module to the owner of the computer system after said shipping, the software upgrade module being configured to store unique identifiers corresponding to the purchased additional software products in the non-volatile memory.

9. The method of claim 8 further comprising installing, by the computer manufacturer, the plurality of software products on the computer system before said shipping.

10. The method of claim 8 further comprising testing, by the computer manufacturer, a compatibility of the plurality of software products with the computer system before said shipping.

11. The method of claim 8 further comprising customizing a hardware configuration of the computer system, by the computer manufacturer, based on an order received from one of a customer and a vendor.

12. The method of claim 10 further comprising receiving an order, by the computer manufacturer, from one of a customer and a vendor for the plurality of software products before the products are installed on the computer system.

13. The method of claim 8 wherein said delivering comprises transmitting the software upgrade module via a network to the computer system.

14. The method of claim 8 further comprising receiving, by the computer manufacturer, a serial number from a customer after said shipping, wherein the software upgrade module is configured to compare the serial number from the customer with the computer system's serial number before storing unique identifiers corresponding to the purchased additional software products in the non-volatile memory.

15. The method of claim 8 further comprising receiving, by the computer manufacturer, a serial number from a customer after said shipping, wherein the computer manufacturer verifies that the serial number from the customer matches a purchased computer system's serial number before said delivering.

16. The method of claim 8 further comprising installing, by the customer, the purchased additional software products using the digital storage media and the unique identifiers that are stored in the non-volatile memory as a result of delivering the software upgrade module.

17. The method of claim 8 further comprising organizing, by the computer manufacturer, the plurality of software products into modules having unique identifiers.

18. The method of claim 17 wherein said organizing the plurality of software products into modules comprises bundling, by the computer manufacturer, software products that are determined to be complementary.

19. The method of claim 17 wherein said organizing the plurality of software products into modules comprises bundling, by the computer manufacturer, software products based on special promotions.

* * * * *

UNITED STATES PATENT AND TRADEMARK OFFICE
CERTIFICATE OF CORRECTION

PATENT NO. : 7,188,255 B1  Page 1 of 1
APPLICATION NO. : 09/483063
DATED : March 6, 2007
INVENTOR(S) : Ker Sze Toh et al.

It is certified that error appears in the above-identified patent and that said Letters Patent is hereby corrected as shown below:

In column 5, line 44, delete "n-technical" and insert -- non-technical --, therefor.

In column 5, line 52, delete "2422" and insert -- 22 --, therefor.

In column 10, line 29, in Claim 8, delete "system:" and insert -- system; --, therefor.

In column 10, line 30, in Claim 8, after "manufacturer" insert -- , --.

Signed and Sealed this

Third Day of March, 2009

JOHN DOLL
*Acting Director of the United States Patent and Trademark Office*